Figure 1A:
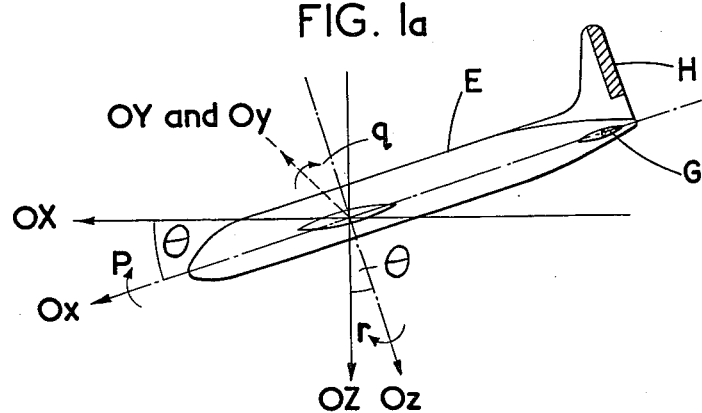

April 23, 1963 F. W. MEREDITH 3,086,732
AUTOMATIC PILOT FOR AIRCRAFT
Filed Feb. 29, 1960 2 Sheets-Sheet 1

INVENTOR:
F. W. MEREDITH
BY: Moore & Hall
ATTORNEYS.

United States Patent Office 3,086,732
Patented Apr. 23, 1963

3,086,732
AUTOMATIC PILOT FOR AIRCRAFT
Frederick William Meredith, Cheltenham, England, assignor, by mesne assignments, to S. Smith & Sons (England) Ltd., London, England, a corporation of England
Filed Feb. 29, 1960, Ser. No. 11,556
11 Claims. (Cl. 244—77)

The present invention relates to automatic pilots for aircraft.

Its object is to provide an automatic pilot of relatively simple construction suitable for use with large transport aircraft and which can be readily coupled to devices responsive to radio navigational signals for control thereby.

In the ensuing description reference will be made to two sets of Cartesian co-ordinate axes: aircraft axes, fixed but instantaneously aligned with the fore-and-aft axis (O$x$) of the tranverse axis (O$y$) and yaw axis (O$z$) of the aircraft and gravitational axes, (OZ) vertically downwards (OX) horizontal and in the same vertical plane as the fore-and-aft aircraft axis (O$x$) and (OY) at right angles to (OX) and (OZ). Thus the aircraft can be thought of as reaching its actual attitude in heading ($\psi$) pitch ($\theta$) and roll ($\phi$) by successive rotations (in that order) from a position with the two sets of axes aligned and OX in an original datum direction, e.g. north. The rates of turn of the aircraft about axes O$x$, O$y$, O$z$ will be denoted in the usual way as $p$, $q$, $r$, and the displacements of the ailerons, elevators and rudder as ($\xi$, $\eta$,$\zeta$). Also the letter "D" will be used to denote the operation of differentation with respect to time, i.e. $d/dt$.

According to the present invention we provide in an automatic pilot for aircraft first and second rate of turn responsive devices giving outputs proportional respectively to $q$ and $r$, a computer device to which said outputs are applied, said computer device being conditioned in accordance with $\phi$ and giving an output proportional to D$\theta$, and a servo system to position the elevators to whose input the computer device output is applied, the elevators being actuated thereby so that their rate of movement (D$\eta$) is in accordance with D$\theta$.

According to a further feature of the invention a further input to the elevator servo system is in accordance with variations from a datum of a quantity representing, at least approximately, the integral with respect to time of the deviation of $\theta$ from some predetermined value, and also in accordance with the rate of change of the variations of the said quantity from its datum. Such a quantity may be, for example, the height, the airspeed, or the deviation from a predetermined glide path, measured as the angle to the horizontal of the line from the aircraft's position to a predetermined touch down point, as determined by radio apparatus operating on a radio beam. Preferably also the further input is in accordance with the integral with respect to the time of the variation of the said quantity from its datum.

Conveniently the rate of turn device output proportional to $r$ is utilised also to control the ailerons, being opposed by a signal proportional to a demanded value of $r$ (to give a $p$ demand signal) and the combined signals being opposed by a signal proportional to $\bar{p}$, and applied to a servo system to position the ailerons, the ailerons being actuated thereby so that their rate of movement (D$\xi$) is proportional to the discrepancy.

Conveniently also the $p$ demand signal is combined, after differentiation with respect to time, with the output of a device responsive to sideslip, the combined signal being applied to the input of a servo system to position the rudder, the rudder being positioned so that its rate of movement (D$\zeta$) is in accordance with the combined signal.

Figure 1B:
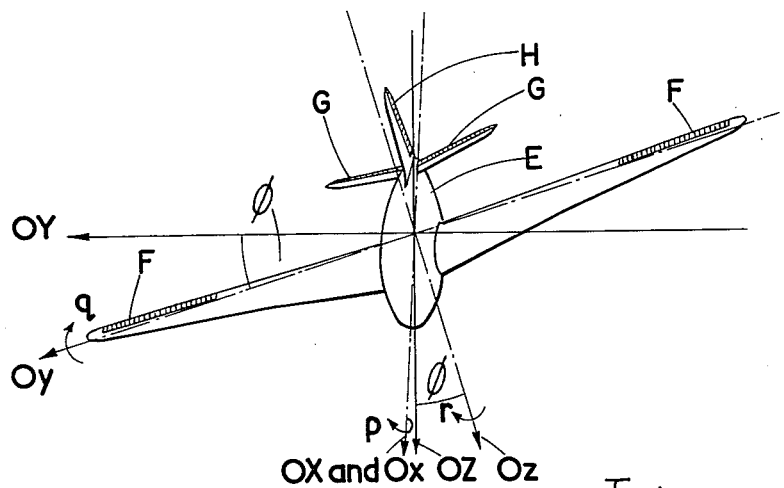
Figure 2:
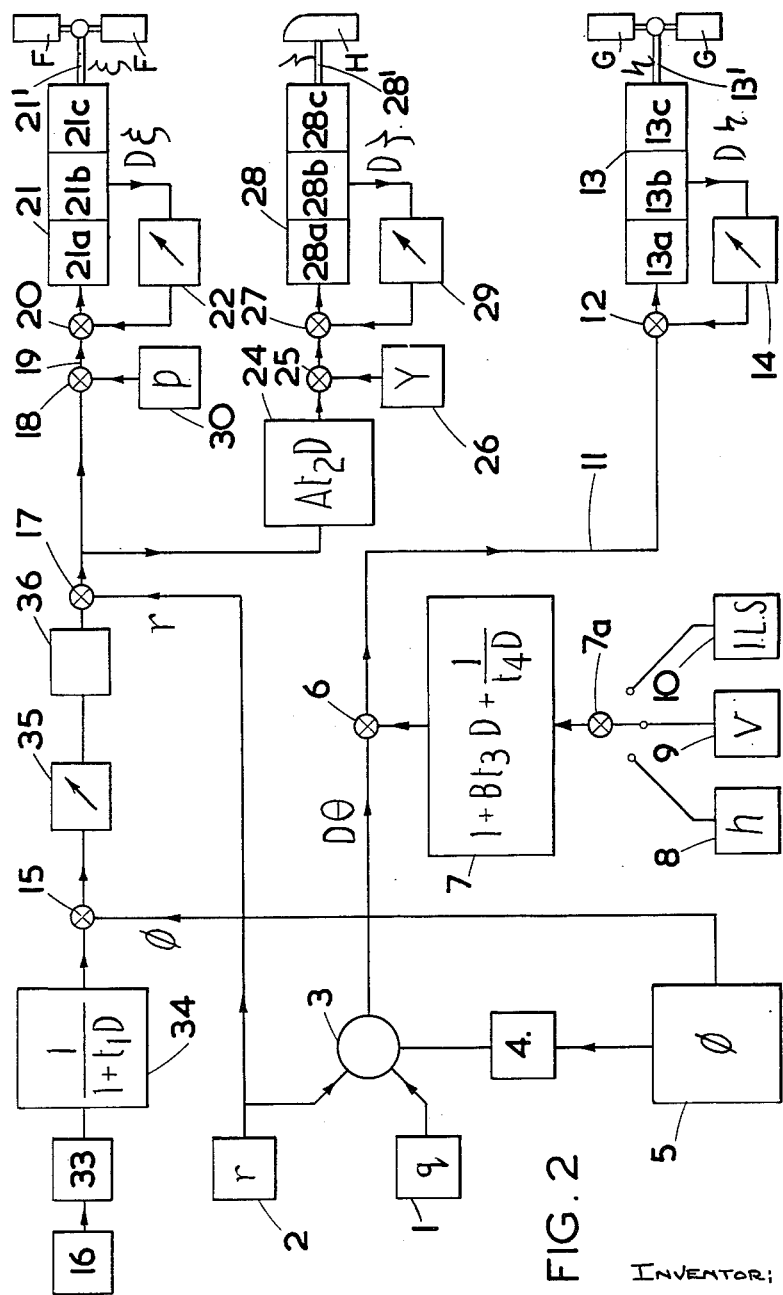

An example of an automatic pilot according to the present invention will now be described with reference to the accompanying drawings in which:

FIGURES 1$a$ and 1$b$ show, for the purposes of explanation, schematic representations of an aircraft and FIGURE 2 shows a block schematic diagram of the automatic pilot.

Referring first to FIGURES 1$a$ and 1$b$ there is shown respectively a side view of an aircraft E having a downward pitch attitude ($\theta$) and a view of the same aircraft E when having a bank attitude ($\phi$), from a point in front, above and to starboard of the aircraft. In both figures, the two sets of axes O$x$, O$y$ and O$z$ and OX, OY and OZ are shown, the axes O$y$ and OY being coincident in FIGURE 1$a$ and the axes O$x$ and OX being coincident in FIGURE 1$b$. The aircraft is provided in known manner with ailerons F, elevators G and a rudder H together with mechanisms for actuating them.

In addition arrows labelled $p$, $q$ and $r$ are included in both FIGURES 1$a$ and 1$b$ to represent the appropriate rotations, as defined above.

Referring now to FIGURE 2, the automatic pilot includes two rate gyroscopes 1 and 2 which are rigidly mounted in known manner with respect to the aircraft E so as to be responsive to "$q$" and "$r$" respectively, and give electrical signal outputs proportional respectively to these quantities. These two signals are applied to a computer device in the form of a conventional sine-cosine resolver 3. For example, in the case of Ac signals, these would be applied to the two stator windings of a synchro resolver 3, the rotor being positioned by a repeater 4 under the control of signals from a conventional gyro-vertical 5 in accordance with $\phi$. The resolver 3 is so arranged that the output therefrom is proportional to the function:

$$q \cos \phi - r \sin \phi$$

that is to say, to D$\theta$. This output is applied to one input of a differential 6. The output from a functional network 7 is applied to the other input of differential 6. The network 7 has a transfer function substantially of the form $$\left(1+Bt_3D+\frac{1}{t_4D}\right)$$

($t_3$ and $t_4$ being time constants and B a numerical factor) where $t_4$ is relatively large, that is to say it conveniently has a direct channel, a differentiating channel and an integrating channel, the latter of long time-constant, in parallel. The integrating channel may conveniently comprise an amplifier, a motor, a tachometric generator and a pick-off device arranged in known manner.

The input to the network 7 is obtained from one of three sources, indicated at 8, 9, 10, as determined by the position of an associated selector switch 7$a$. A source producing signals in accordance with deviation of the aircraft from a predetermined height is indicated at 8, one producing signals in accordance with deviation from a predetermined airspeed is indicated at 9, and one producing signals in accordance with deviation from a radio defined glide path is indicated at 10. The deviation of the aircraft from a predetermined height, airspeed, or glide path (measured as the deviation from a datum of the angle to the horizontal of the line from the aircraft's position to a predetermined touch down point) is approximately in accordance with the integral of the deviation of $\theta$ from a value corresponding to the maintenance of that height, airspeed or glide path as the case may be.

Each of the sources 8, 9, 10 is so arranged that its output is maintained at zero when it is not connected to network 7, each source comprising, for example, appropriate condition responsive means coupled to a suitable spring centred pick-off (providing the output) through a clutch which is disengaged except when the output is connected to network 7.

The output from differential 6, constituting a rate of elevator movement demand signal, is applied to an elevator actuating servo system of a known kind, comprising a differential 12 to one input of which the demand signal is applied and whose output is applied to the input of an amplifier, motor and tachometric generator combination indicated at 13. The combination 13 comprises a servo amplifier and motor 13a, the motor of which drives a tachometric generator 13b and an output clutch 13c. The latter, when engaged, transmits the motor drive through a mechanical linkage 13$^1$ (indicated only diagrammatically in FIGURE 2) to the elevators G of the aircraft. The linkage 13$^1$ is part of the normal elevator operating gear and the clutch 13c, is disengageable to enable the pilot to take over direct control of the elevators G whenever required. The output of the tachometric generator 13b proportional to D$\eta$, is applied through a preset attenuator 14 to the other input of differential 12. The elevator is thus positioned by the servo system so that the demand is met. It should be noted that if each of the sources 8 and 9, is provided with means to reset its output to zero when not connected to device 7 the elevator will be actuated to maintain the corresponding quantity at its value when the connection is made.

The ailerons F (and also the rudder H) are controlled in accordance with azimuth manoeuvre demands, derived from a device indicated at 16. Azimuth manoeuvre demands may arise from a variety of sources, for example, a signal being obtained from a compass device in accordance with discrepancy between the demanded and actual heading of the aircraft if it is desired to fly at a selected heading, or derived from directional radio equipment if it is desired to attain and follow a radio-defined track. The output from device 16 is applied to a signal limiter 33 (to limit the maximum azimuth manoeuvre demand) to a phase lag device 34, having a transfer function of the form $$\frac{1}{1+t_1D}$$

(to prevent excessively rapid changes in azimuth manoeuvre demand and thus excessive roll accelerations), the output from lag device 34 constituting the azimuth manoeuvre demand signal. This is applied to one input of a differential 15, to whose other input is applied a bank ($\phi$) signal from gyro-vertical 5, in opposition to the azimuth manoeuvre demand signal. The output from differential 15 is applied, through a pre-set adjustable gain network 35 and a limiter 36 to one input of a differential 17, being opposed by a rate of yaw signal (r) derived from gyro 2 and applied to the other input of differential 17. The output from differential 17 is applied to one input of a differential 18, being opposed by a rate of roll (p) signal derived from a further rate gyroscope 30 generally similar to gyros 1 and 2 rigidly attached to the aircraft. The output from a differential 18, constituting a rate of aileron movement demand signal, is applied to an aileron actuating servo system of a known kind, comprising a differential 20, to one input of which the demand signal is applied and the output of which is applied to the input of an amplifier, motor and tachometric generator combination indicated at 21. The combination 21 comprises a servo amplifier and motor 21a, the motor of which drives a tachometric generator 21b and an output clutch 21c. The latter, when engaged, transmits the motor drive through a mechanical linkage 21$^1$ to the ailerons F of the aircraft. The linkage 21$^1$ is part of the normal aileron operating gear and the clutch 21c is disengageable to enable the pilot to take over the normal direct control of the ailerons F, whenever required. The output of the tachometric generator 21b is fed back to the other input of differential 20. Thus, in the same manner as with the elevators G, the ailerons F are positioned in such a manner that their rate of movement (D$\xi$) has the demanded value.

The output from differential 17 is also applied to the input of a device 24 having a transfer function substantially of the form A$t_2$D where $t_2$ is a time constant and A is a numerical factor whose output is applied to one input of a differential 25 being opposed by a signal from a side-slip (Y) detector 26. (Side-slip detector 26 conveniently comprises in known manner a pendulum mounted for oscillation about an axis parallel to the Ox axis and means for generating an electric signal the magnitude of which is dependent on the magnitude of any deflection of the pendulum from its mean position.) The output from differential 25 constitutes a rate of rudder movement demand signal, and is applied to a rudder actuating servo system of known kind, comprising a differential 27, the combination 28 of amplifier and servomotor 28a tachometric generator 28b and clutch 28c, the pre-set attenuator 29, and the mechanical linkage 28$^1$ to the rudder H, corresponding to and operating in the same manner as the elevator and aileron actuating servo systems described above. The rudder H is thus positioned so that its rate of movement (D$\zeta$) has the demanded value.

By a differential it will be appreciated that we mean a device having two inputs and a single output, the output being a linear function of the two inputs. The relative senses of the inputs and outputs to the various differentials referred to will be clear to those skilled in the art.

It will also be appreciated that the transfer functions "A$t_2$D" and "B$t_3$D" will be most conveniently approximated by transfer functions of the form:

$$\frac{At_2D}{1+t_2D} \text{ and } \frac{Bt_3D}{1+t_3D}$$

the time-constants $t_2$, $t_3$ being small compared with the periods of the relevant aircraft motions.

The operation of the system is as follows:

If we suppose that there is no output from network 7, the elevators G will be actuated in such a manner as to maintain the rate of pitch zero, that is to say the pitch attitude constant. In these circumstances the pitch attitude would be indeterminate. However, the output of network 7 provides the necessary pitch control datum. If the aircraft E is required to fly at a constant height, the input of network 7 is connected to device 8 by the switch 7a when the aircraft is at that height. The elevators G are then controlled by the actuating servo system (combination 13 etc.) so that the signal in channel 11 subsides to zero in known manner. This implies that the aircraft E attains a condition (in the absence of disturbances) such that its pitch attitude is constant and it is at the desired height. The "B$t_3$D" term in the transfer function of network 7 provides in a known manner improved response to changes in height and is necessary for stability. The "1/$t_4$D" term ensures the eventual elimination of zero errors in the control channel. Thus if we suppose the "1/$t_4$D" term omitted and that there is a zero error, i.e. when D$\theta$ is zero there remains an output signal from device 3, the aircraft will attain a constant height condition in which the signal from device 8 backs off the zero error. When the "1/$t_4$D" term is inserted, the signal from device 8 will be integrated with respect to time and a state will be reached in which the integrated signal will back off the zero error and the signal itself will be zero, i.e. the aircraft will be at the desired height. The "1/$t_4$D" term thus compensates for zero errors due to drift and the like. It may therefore be desirable to limit the maximum rate of change of this term to obtain optimum performance of the elevator control channel.

If the aircraft is required to fly at a constant airspeed or along a particular glide path the input to network 7 will be obtained from device 9 or 10 as the case may be by operating the switch 7a when the elevators G will be controlled to maintain the airspeed or position in relation to the glide path at which connection is made. It will be appreciated that on changing the source of input to network 7 between devices 8, 9 and 10 the zero error compensation provided by the $1/t_4D$ term of the transfer function of network 7 remains unaffected.

The ailerons F (and the rudder H) are as stated earlier controlled by the azimuth manoeuvre demand signal. It will be seen that the azimuth manoeuvre demand is opposed by a linear combination of $\phi$ and $r$ (as long as the signal at the input of limiter 36 is below its ceiling). The discrepancy between the manoeuvre demand and this linear combination is opposed by the "$p$" signal from gyro 30, and the ailerons F are controlled in accordance with the result. A rate of roll will therefore be applied to the aircraft in accordance with the discrepancy, and a condition eventually attained in which the discrepancy is reduced to zero. The aircraft is thus banked, and therefore, in the absence of side-slip, turning in azimuth, by an amount and at a rate determined by the azimuth manoeuvre demand. If the azimuth demand were opposed merely by the $r$ signal the variation of maximum bank angle (corresponding to the maximum rate of turn determined by the ceiling of limiter 36) would be unacceptable over the whole speed range of the aircraft, and by the insertion of the $\phi$ term this variation may be brought to an acceptable level. It will be appreciated that the relative weightings of the $\phi$ and $r$ signals may be adjusted by means of network 35.

It will be seen that, owing to the form of the transfer function of device 24, only changes in the output from differential 17 affect the operation of the rudder H. In the absence of such changes the rudder is operated, under the control of signals from side-slip detector 26, to counteract side-slip. The output signal from device 24 ensures that the rudder is actuated correctly to assist entry to and exit from a turn, and to damp yawing oscillations of the aircraft.

In the particular automatic pilot described above, the various signals applied from one part of the pilot to another are mostly electrical signals, but it will be appreciated that this is not always necessary in practice and that other signals for example mechanical signals such as the rotation of a shaft or the translation of a coupling link may equally be employed if so required.

In addition various networks, resolvers, differential devices and servo systems are referred to in general terms. These may take any suitable form and for examples and explanations of particular forms reference may be made to "Theory of Servo Mechanisms" published by McGraw-Hill (edited by James, Nichols and Phipps) being volume 25 of the Radiation Laboratory Series.

Reference is made to my U.S. Patent No. 2,801,816, granted August 6, 1957, for Automatic Control Systems for Aircraft.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:
1. In an automatic pilot for an aircraft having elevators, ailerons and a rudder and also having first, second and third axes forming a set of orthogonal axes aligned with its fore and aft axis, its transverse axis and its yaw axis, respectively, the combination of first and second rate of turn detectors for generating output signals proportional respectively to the rates of turn ($q$ and $r$) of the aircraft about its second and third axes, a computing device, means for applying said output signals to the computing device, means for generating a signal dependent on the angle of bank ($\phi$) of the aircraft about its first axis and for conditioning the computing device to operate in dependence on said signal, the computing device responding to said applied signals to generate a control signal proportional to the aircraft's rate of change of pitch attitude ($D\theta$) about a horizontal axis with time, an elevator positioning system, control means arranged to respond to an input signal to actuate said elevator positioning system to change the position of the elevators at a rate dependent on the magnitude of an input signal and means for applying said control signal as an input signal to the control means.

2. In an automatic pilot for an aircraft having elevators, ailerons and a rudder and also having first, second and third axes forming a set of orthogonal axes aligned with its fore and aft axis, its transverse axis and its yaw axis, respectively, the combination of first and second rate of turn detectors for generating output signals proportional respectively to the rate of turn of the aircraft about its second and third axes ($q$ and $r$), a computing device, means for applying said output signals to the computing device, means for generating a signal dependent on the angle of bank ($\phi$) of the aircraft about its first axis and for conditioning the computing device to operate in dependence on said signal, the computing device responding to said applied signals to generate a control signal proportional to the aircraft's rate of change of pitch attitude ($D\theta$) about a horizontal axis with time, an elevator positioning system, control means arranged to respond to an input signal to actuate said elevator positioning system to change the position of the elevators at a rate dependent on the magnitude of an input signal, differential means having first and second signal inputs and a signal output, means coupling the signal output to the control means, means for applying said control signal to the first signal input of the differential means and means for generating a further control signal and for applying said further control signal to the second signal input of the differential means, said further control signal depending on any variations from a datum value of a quantity which itself represents, at least approximately, the integral with respect to the time of the deviation of the aircraft's pitch attitude from some predetermined value, and said further control signal also depending on the rate of change of the variations of said quantity from said datum value with respect to time.

3. An automatic pilot according to claim 2 in which said quantity is the height of the aircraft.

4. An automatic pilot according to claim 2 in which said quantity is the airspeed of the aircraft.

5. An automatic pilot according to claim 2 in which said quantity is the angle to the horizontal of the line from the aircraft's position to a predetermined touch down point.

6. In an automatic pilot for an aircraft having elevators, ailerons and a rudder and also having first, second and third axes forming a set of orthogonal axes aligned with its fore and aft axis, its transverse axis and its yaw axis, respectively, the combination of first and second rate of turn detectors for generating output signals proportional respectively to the rate of turn of the aircraft about its second and third axes ($q$ and $r$), a computing device, means for applying said output signals to the computing device, means for generating a signal dependent on the angle of bank ($\phi$) of the aircraft about its first axis and for conditioning the computing device to operate in dependence on said signal, the computing device responding to said applied signals to generate a control signal proportional to the aircraft's rate of change of pitch attitude ($D\theta$) about a horizontal axis with time, an elevator positioning system, control means arranged to respond to an input signal to actuate said elevator positioning system to change the position of the elevators at a rate dependent on the magnitude of an input signal, differential means having first and second signal inputs and a signal output, means coupling the signal output to the control means, means for applying said control signal to the first signal input of the differential means and means for generating a further control signal and for applying said further control signal to the second signal input of the differential means, said further control signal depending on any variation from a datum of a quantity which itself represents, at least approximately, the integral with respect to time of the deviation of the aircraft's pitch attitude from some predetermined value, and said control signal further depending on both the rate of change of the variations of said quantity from said datum value with respect to time and the integral of the variations of said quantity from said datum value with respect to time.

7. An automatic pilot according to claim 6 in which said quantity is the height of the aircraft.

8. An automatic pilot according to claim 6 in which said quantity is the airspeed of the aircraft.

9. An automatic pilot according to claim 6 in which said quantity is the angle to the horizontal of the line from the aircraft's position to predetermined touch down point.

10. An automatic pilot, according to claim 1 which further comprises an aileron positioning system, control means arranged to respond to an input signal to actuate said aileron positioning system to change the position of the ailerons at a rate dependent on the magnitude of an applied signal and means for deriving a rate of aileron movement demand signal and for applying it as an input signal to the control means, said means comprising a source of azimuth manoeuvre demand signals, a signal combining network coupled to said source, to said second rate of turn detector and to said angle of bank signal generator and operative to combine the signals generated thereby to form a rate of bank demand signal, a third rate of turn detector for generating an output signal proportional to the rate of turn $(p)$ of the aircraft about its first axis, differential means and means for applying the output signals of said third rate of turn detector and the signal combining network to the differential means in opposite senses to generate a rate of aileron movement demand signal.

11. An automatic pilot, according to claim 10 which further comprises a differentiating network for generating an output signal which is the differential with respect to time of an applied signal, means for applying the output signal from said signal combining network to said differentiating network, a further differential means, a side-slip detector for generating an output signal on the occurrence of side-slip of the aircraft, means for applying the output signals of said differentiating network and the side-slip detector to said further differential means to generate a rate of rudder movement demand signal, a rudder positioning system, control means arranged to respond to an input signal to actuate said rudder system to change the position of the rudder at a rate dependent on the magnitude of an applied signal, and means for applying said rate of rudder movement demand signal to said control means.

References Cited in the file of this patent
UNITED STATES PATENTS 2,801,816     Meredith _____ Aug. 6, 1957